(12) United States Patent
Mori

(10) Patent No.: US 10,248,223 B2
(45) Date of Patent: Apr. 2, 2019

(54) POINTING DEVICE FITTING STRUCTURE AND POINTING DEVICE

(71) Applicant: MINEBEA MITSUMI INC., Kitasaku-gun, Nagano (JP)

(72) Inventor: Masao Mori, Fujisawa (JP)

(73) Assignee: MINEBEA MITSUMI INC., Nagano (JP)

( * ) Notice: Subject to any disclaimer, the term of this patent is extended or adjusted under 35 U.S.C. 154(b) by 313 days.

(21) Appl. No.: 14/857,195

(22) Filed: Sep. 17, 2015

(65) Prior Publication Data

US 2016/0091985 A1 Mar. 31, 2016

(30) Foreign Application Priority Data

Sep. 29, 2014 (JP) ................................. 2014-199467

(51) Int. Cl.
*G06F 3/0338* (2013.01)

(52) U.S. Cl.
CPC .................. *G06F 3/0338* (2013.01)

(58) Field of Classification Search
CPC ......... G05G 9/047; G05G 2009/04707; G05G 2009/0474; B64C 13/04; E02F 9/2004; B63H 21/213; G06F 3/0338; G06F 3/0383; G06F 3/016
USPC ......................................... 74/471 R; 345/161
See application file for complete search history.

(56) References Cited

U.S. PATENT DOCUMENTS

| | | | |
|---|---|---|---|
| 2002/0024503 A1* | 2/2002 | Armstrong ............. | G05G 9/047 345/167 |
| 2003/0016209 A1 | 1/2003 | Narusawa et al. | |
| 2012/0206338 A1 | 8/2012 | Furukawa et al. | |
| 2014/0145946 A1* | 5/2014 | Takahashi ............. | G06F 3/0338 345/157 |
| 2014/0154002 A1* | 6/2014 | Fujita .................... | G06F 3/0338 403/345 |

FOREIGN PATENT DOCUMENTS

| | | |
|---|---|---|
| JP | 2000-214985 A | 8/2000 |
| JP | 2012-181827 A | 9/2012 |
| JP | 2012-208870 A | 10/2012 |
| JP | 5285001 B2 | 9/2013 |
| JP | 2014-106932 A | 6/2014 |

OTHER PUBLICATIONS

Feb. 2, 2017 Office Action issued in Japanese Patent Application No. 2014-199467.

* cited by examiner

*Primary Examiner* — Amare Mengistu
*Assistant Examiner* — Gloryvid Figueroa-Gibson
(74) *Attorney, Agent, or Firm* — Pearne & Gordon LLP

(57) ABSTRACT

There is provided a pointing device fitting structure. The pointing device fitting structure includes a frame provided with a projecting portion, and a support member to which a pointing stick is attached. The frame is fixed to the support member via the projecting portion.

17 Claims, 2 Drawing Sheets

POINTING DEVICE FITTING STRUCTURE AND POINTING DEVICE

CROSS REFERENCE TO RELATED APPLICATION

The present application claims priority from Japanese Patent Application No. 2014-199467 filed on Sep. 29, 2014, and titled "POINTING DEVICE FITTING STRUCTURE AND POINTING DEVICE", the disclosure of which is incorporated herein by reference in its entirety.

BACKGROUND OF THE INVENTION

Field of the Invention

The present teaching relates to pointing device fitting structures for pointing device which includes a pointing stick. The pointing stick has a manipulation portion, and cursors can be moved (manipulated) by tilting the manipulation portion of the pointing stick. The present teaching relates, in particular, to pointing device fitting structures and a pointing device which are used for notebook-type computers (notebook personal computer (PC), laptop PC), game consoles (game machines), and the like.

Description of the Related Art

As notebook PCs spread, a pointing stick comes into use for moving a cursor on a display of a notebook PC. A space required to use the notebook PC with the pointing stick can be smaller, because a mouse is not necessary for moving the cursor on the display, and thus the notebook PC with the pointing stick is particularly convenient to use in airplanes, trains, or the like in transit.

For example, Japanese Patent Application Laid-open No. 2000-214985 discloses a pointing device having a detecting element to detect an manipulation amount (displacement amount) of the pointing stick, and a fitting structure for fitting the pointing device to a base member.

SUMMARY

In a pointing device fitting structure disclosed in Japanese Patent Application Laid-open No. 2000-214985, as is clearly seen in FIG. 6 of the document, a pointing device has a fitting member made of a flat metallic plate, a detection element provided in the fitting member, and a pointing stick; and the pointing device is fixed on the base member made of a metallic plate such as an aluminum plate or the like. Specifically, the pointing device is fixed on the base member by inserting a rivet through a through hole penetrating through both the fitting member and the base member, and then caulking the rivet (deforming the end of the rivet). By covering the sub-assembly obtained by the above steps with a housing (frame) shown in FIG. 1 of Japanese Patent Application Laid-open No. 2000-214985, it is obtained the pointing stick which projects out from between specific operation keys to above the upper side of a keyboard via a stick insertion hole in the housing.

According to the above pointing device fitting structure, in order to cause the pointing stick to project out from a predetermined precise position of the upper surface of the keyboard, it is necessary to strictly manage and control the dimensional precision of each and every component of the pointing device, the base member, and the housing. Additionally, it is also necessary to strictly manage and control the assembly tolerance in fixing the pointing device onto the base member, and the assembly tolerance in covering the base member with the housing and in fixing the housing to the base member. It is not preferable to strictly manage and control the dimensional tolerance for each component and the assembly tolerance between the respective components in such a manner, because the cost of the product per se is increased by performing such strict management.

On the other hand, by enlarging a hole (the stick insertion hole), in the housing, for projecting the stick manipulating portion, it is possible to cause the pointing stick to project out from the stick insertion hole of the housing without strictly managing and controlling the dimensional tolerance for each component and the assembly tolerance between the components described above. In such a configuration, however, there is a fear that the pointing stick deviates from the central axis line of the stick insertion hole of the housing. In such a case, the top end of the pointing stick projects out from the keyboard operation surface in a state that the pointing stick is extremely close to only some of the operation keys arrayed on the housing, and the appearance of the keyboard deteriorates. In addition to that, there is a fear that direction(s) in which the pointing stick cannot be tilted sufficiently, during an operation of the pointing stick, arise(s) due to an interference between the pointing stick and a portion of the housing, and an operation of the pointing stick is impeded. Further, even if it is supposedly possible to assemble every component without causing such deviation as described above, the following problems may occur. That is, because a gap is formed at a somewhat large size between the pointing stick and the stick insertion hole of the housing, some foreign substances may come into the housing via the gap to impede keyboard operation, and/or foreign substances may be caught in the gap to make it impossible to operate the pointing stick appropriately.

Such problems as mentioned above are particularly noticeable with notebook PCs in considerably small sizes, which are convenient for portage, which are manufactured in large numbers especially in recent years, and which are provided with a pointing stick. This is because such small size notebook PCs have narrower intervals between the respective operation keys on the keyboard due to the construction of the PCs, and space for disposing the pointing stick is also small.

An object of the present teaching is to provide a pointing device fitting structure and a pointing device which are easy to assemble, which can fix the positional relationship between the frame and the pointing stick with no deviation, and which can realize a low profile of the product.

According to a first aspect of the present teaching, there is provided a pointing device fitting structure including: a frame provided with a projecting portion; and a support member to which a pointing stick is attached, wherein the frame is fixed to the support member via the projecting portion.

According to a second aspect of the present teaching, there is provided a pointing device including: a support member; and a pointing stick attached to the support member wherein the support member is formed with a through hole through which a projecting portion is insertable, the projecting portion being provided on a frame to be joined to the pointing device, and wherein a chamfered portion is formed in the through hole.

According to a third aspect of the present teaching, there is provided a pointing device fitting structure including: a frame which has an aperture and a plurality of projection portions provided around the aperture; and a pointing device which includes a support member and a pointing stick attached to the support member in a tiltable manner, wherein the support member is fixed to the frame via the projection portion, and the pointing stick is inserted into the aperture.

DESCRIPTION OF THE EMBODIMENTS

Figure 1:
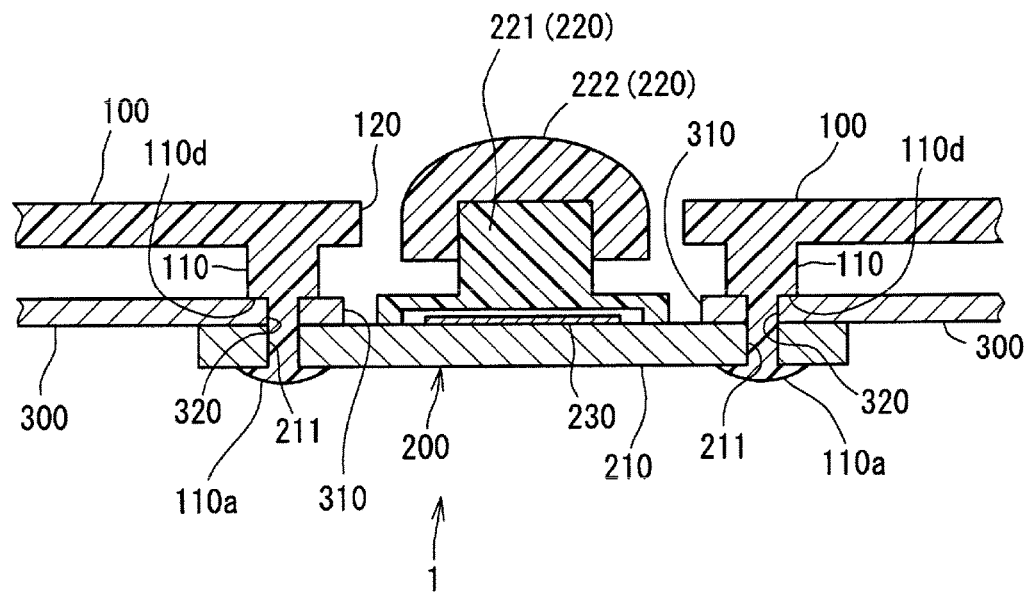
FIG. 1 is a cross-sectional view depicting a pointing device fitting structure related to a first embodiment of the present teaching.

Hereinbelow, an explanation will be made on a pointing device fitting structure related to each embodiment of the present teaching. The pointing device fitting structure related to each embodiment of the present teaching is applied to a notebook PC which includes a pointing stick between operation keys of the keyboard. In the drawings, the sizes, thicknesses, and dimensions of components or parts related to the embodiments and modified embodiment are depicted exaggeratedly for easy understanding of the present teaching. Further, in the following explanation, the term "upper side" or "lower side" of an object means the "upper side" or the "lower side" of the object depicted in drawings.

First, an explanation will be made on a pointing device fitting structure 1 related to a first embodiment of the present teaching. FIG. 1 is a cross-sectional view depicting the pointing device fitting structure 1 related to the first embodiment of the present teaching.

The pointing device fitting structure 1 related to the first embodiment is a fitting structure for pointing device which includes a pointing stick. The pointing stick has a manipulation portion, and a cursor on a display can be moved (manipulated) by tilting the manipulation portion of the pointing stick. The pointing device fitting structure 1 includes a frame 100, a support member 210 on which the pointing stick 220 is fitted, and a base member 300 on which a membrane substrate, operation keys and the like are arrayed. The frame 100 has projecting portions 110 each formed with a stepped portion 110d, the support member 210 has a support member through hole 211 (hereinafter referred to as "through hole 211"), and the base member 300 has a base member through hole 320 (hereinafter referred to as "through hole 320"). The top ends (top end portions) of the projecting portions 110 of the frame 100 are inserted through the through holes 211 and 320 of the support member 210 and the base member 300, and fixed to the support member 210 by way of welding.

Each of the above components will be explained below in more detail. The frame 100 is made of a resin. Although not depicted in FIG. 1, a number of opening portions are formed in the frame 100 such that no interference will occur between the frame 100 and the many operation keys arrayed on the base member 300. Further, a stick manipulating portion projection hole 120 (hereinafter referred to as "hole 120") is formed in a predetermined position of the frame 100 such that a stick manipulating portion 222, of the pointing stick 220, provided between some adjacent operation keys among the operation keys arrayed on the base member 300 projects upward above the frame 100. The projecting portions 110 are provided to project downward on a region, of the lower surface of the frame 100, defined around the hole 120, for example, at three places in a circumferential direction of the hole 120. The stepped portions 110d are formed in a predetermined longitudinal position of the projecting portions 110, respectively, such that each projecting portion 110 is formed to be larger in diameter on the base end side of the stepped portion 110d whereas each projecting portion 110 is formed to be smaller in diameter on the top end side of the stepped portion 110d. The lower parts of the projecting portions 110 (the parts on the top end sides of the stepped portions 110d) are inserted through the through holes 320 of the base member 300 and through the through holes 211 of the support member 210 both of which will be described later on, and the top ends of the projecting portions 110 are fixed on the lower surface of the support member 210 by way of welding (see welded portions 110a in FIG. 1). The upper surface of the base member 300 is in contact with the each of stepped portions 110d. In the above description, it is explained that the stepped portion 110d is formed by making the projecting portion 110 be larger in diameter on the base end side but be smaller in diameter on the top end side. However, a stepped portion may be formed by shaping the projecting portion 110 as follows. That is, the projecting portion 110 may be shaped to have a center portion which is small in diameter and which extends from the base end side to the top end side, and a rib which is provided on an outer circumferential surface of the center portion and which extends from the base end side to a predetermined longitudinal position of the center portion. In this manner, sink becomes less likely to occur in the frame 100. The welding can be performed with any method, such as thermal welding, ultrasonic welding, etc, that uses heating and melting of the resin to fix the projecting portions 110 onto the support member 210.

As an example, the base member 300 is made of a metallic plate. Although not depicted in FIG. 1, the many operation keys are arrayed on the upper surface of the base member 300. Further, a base member opening portion 310 (hereinafter referred to as "opening 310") is formed in the base member 300, and the opening 310 has a diameter slightly larger than a diameter of the hole 120 of the frame 100. Note that, the hole 120 of the frame 100 and the opening 310 of the base member 300 are formed in a manner that the hole 120 and the opening 310 are arranged concentrically in a state that the pointing device 200 and the base member 300 are assembled on the frame 100. Further, the through holes 320, through which the projecting portions 110 of the frame 100 are inserted respectively, are formed around the opening 310, for example, at three places in the circumferential direction of the opening 310.

The support member 210 is made of, as an example, a metallic plate. The pointing stick 220 is attached on the upper surface of the support member 210. In the support member 210, the through holes 211, through which the projecting portions 110 of the frame 100 are inserted respectively, are formed, for example, in three places. The projecting portions 110 of the frame 100, the through holes 211 of the support member 210 and the through holes 320 of the base member 300 are formed in a manner that the central axis line of each projecting portions 110 of the frame 100 passes through the center of each through holes 320 and the center of each through holes 211 in a state that the pointing device 200 and the base member 300 are assembled on the frame 100.

The pointing device 200 is formed from the support member 210, the pointing stick 220 and a strain gage 230. The pointing stick 220 includes a stick body 221 made of a resin, and a stick manipulating portion 222 which is made of a resin or a rubber and which is provided on an upper part of the stick body 221. A known strain gage 230 is attached to the base end side of the stick body 221 to detect the amount of manipulation (amount of displacement) and the direction of manipulation of the pointing stick 220. Note that, the configuration of the pointing device described above is disclosed in, for example, Japanese Patent Application Laid-open No. 2000-214985 or Japanese Patent No. 5285001, and thus, the explanation for its detailed configuration is omitted.

As it is clear from the configuration described above, in the first embodiment, the pointing device 200 is not fixed merely on the base member 300 unlike the conventional techniques. Specifically, the pointing device 200 is joined to each of the projecting portions 110 via the welded portion 110a formed by way of inserting the top end of each of the projecting portions 110 of the frame 100 into the through hole 211 formed in the support member 210, and then melting the top end. By virtue of this, the pointing device 200 is directly fixed to the frame 100 per se. Similarly, the base member 300 is also directly fixed to the frame 100 via the projecting portions 110 by being sandwiched between the support member 210 and the stepped portion 110d of each of the projecting portions 110 of the frame 100. That is, each of the projecting portions 110 of the frame 100 also plays the role of fixing the pointing device 200 on the lower surface of the base member 300. Further, the stepped portion 110d of the projecting portion 110 plays the role of keeping a distance between the frame 100 and the base member 300 constant in a state that every component is assembled. By virtue of this, a distance between the frame 100 and the support member 210 is also kept constant in a state that every component is assembled.

Due to the configuration as described above, the pointing device fitting structure 1 related to the first embodiment of the present teaching can solve some defects of the pointing device fitting structures related to the conventional techniques described above. Specifically, in the pointing device fitting structure 1, the pointing device 200 is directly fixed to the frame 100 via the projecting portions 110 of the frame 100. Thus, it is possible to project the pointing stick 220 above the upper surface of the frame 100, on which the operation keys are arrayed, at the center of the hole 120 of the frame 100 without strictly managing or controlling all of the dimensional precision of the frame 100, pointing device 200 and base member 300 and without strictly managing or controlling the assembling tolerance for each component, unlike the conventional technique. That is, because it is not necessary to manage or control the dimensional tolerance and assembling tolerance of each component as strictly as the conventional technique, it is possible to project the pointing stick 220 above the upper surface of the frame 100 at a predetermined position of the frame 100 without extra cost and consequently, it is possible to obtain good-looking products (notebook PCs) without extra cost.

Further, in the pointing device fitting structure 1 related to the first embodiment, the pointing device 200 is directly fixed to the frame 100 via the projecting portions 110 of the frame 100. Therefore, it is not necessary to form, in the frame 100, the hole 120 of a considerably larger size than the outside diameter of the stick manipulating portion 222 of the pointing stick 220 for the purpose of avoiding product cost increase caused due to the strict management or control of dimensional tolerance and assembling tolerance of every component. Accordingly, there is no need of creating a gap larger than necessary between the hole 120 in the frame 100 and the pointing stick 220. As a result, the fear that some foreign substances may come inside the frame 100 via such a gap to cause malfunction of the keyboard, and/or the fear that some foreign substances may be caught in the gap to make it impossible to manipulate the pointing stick 220 appropriately is/are overcome.

Further, based on the pointing device fitting structure 1 related to the first embodiment, it is possible to securely fix both the pointing device 200 and the base member 300 to the frame 100 by way of welding of the projecting portion 110 of the frame 100 to the pointing device 200. Therefore, it is not necessary to use fastener components such as screws or the like, and thus it is possible to lessen the number of steps for assembling each component, and to reduce the manufacturing cost.

Figure 2:
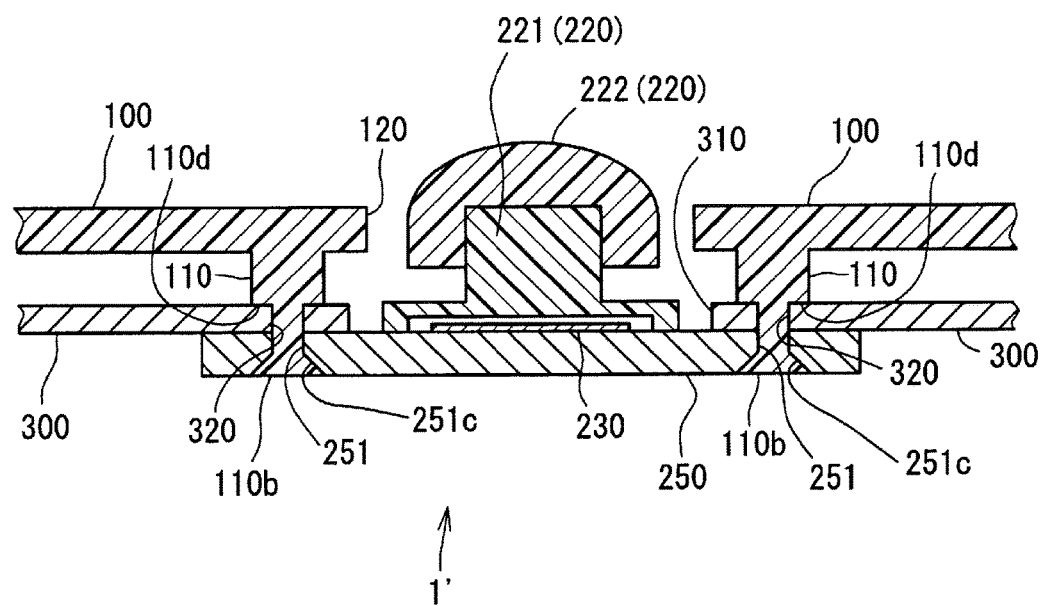
FIG. 2 is a cross-sectional view depicting a modification of the pointing device fitting structure depicted in FIG. 1.

Next, an explanation will be made on a modification of the pointing device fitting structure 1 related to the first embodiment described above. FIG. 2 is a cross-sectional view depicting the modification of the pointing device fitting structure 1 depicted in FIG. 1. Note that, corresponding reference numerals are assigned to the components equivalent in configuration to those of the first embodiment described above, and any detailed explanation therefor will be omitted.

Differently from the first embodiment described above, a pointing device fitting structure 1' related to the modification has a chamfer portion (C-chamfer portion) 251c formed throughout the entire circumference of the lower opening portion, of each support member through hole 251 (hereinafter referred to as "through hole 251"), defined on the lower surface of a support member 250 (the opposite surface from the contact surface with the base member 300). Each of the chamfered portions 251c has such an angle and depth designed as follows. That is, the chamfered portion 251c is designed to have such a dimension that, a welded portion 110b, which is formed at the top end of each of the projecting portions 110, does not come out of the lower surface (bottom surface) of the support member 250 when the projecting portions 110 of the frame 100 are inserted through the through holes 320 of the base member 300, inserted through the through holes 251 of the support member 250, and is welded to the support member 250.

Based on the pointing device fitting structure 1' related to the above modification, it is possible to securely fix the pointing device 200 to the frame 100 and the base member 300 by fixing the welded portion 110b formed at the top end of each of the projecting portions 110 of the frame 100 to a recess formed by the chamfered portion 251c of the through hole 251 of the support member 250. Further, based on the pointing device fitting structure 1' related to the above modification, because the welded portions 110b do not come downwardly out of the lower surface of the support member 250, it is possible to realize a low profile of the product.

Figure 3:
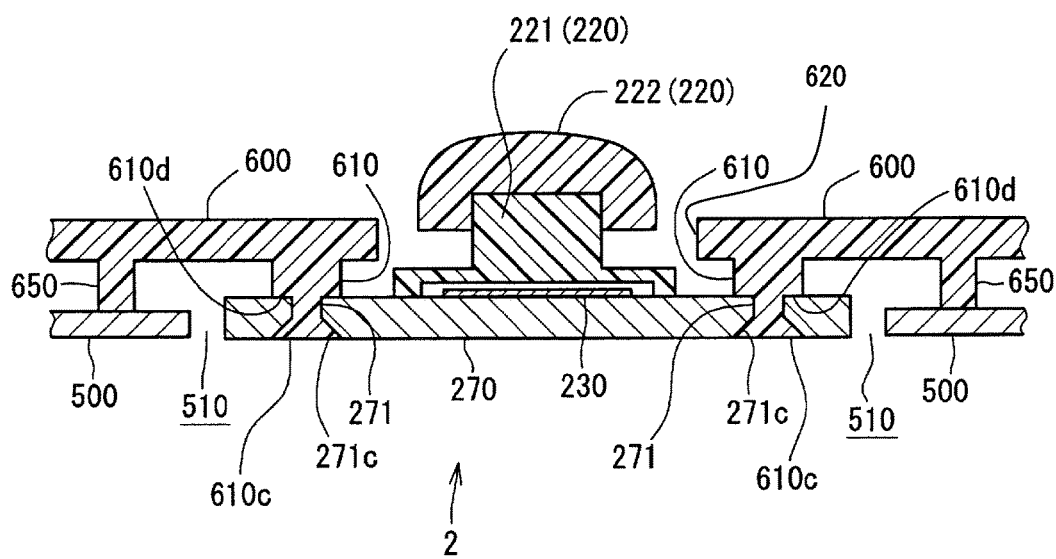
FIG. 3 is a cross-sectional view depicting a pointing device fitting structure related to a second embodiment of the present teaching.

Next, an explanation will be made on a pointing device fitting structure 2 related to a second embodiment of the present teaching. FIG. 3 is a cross-sectional view depicting a pointing device fitting structure 2 related to a second embodiment of the present teaching. Further, corresponding reference numerals are assigned to the components equivalent in configuration to those of the first embodiment and its modification described above, and any detailed explanation therefor will be omitted.

Differently from the first embodiment and its modification described above, in the pointing device fitting structure 2 related to the second embodiment of the present teaching, a base member opening portion 510 (hereinafter referred to as "opening 510") is formed in a base member 500. The opening 510 is a clearance portion (or an escaping portion, or a space) to arrange a support member 270 and the base member 500 on the same plane without causing interference between the support member 270 and the base member 500. Specifically, the opening 510, having a diameter slightly larger than the diameter of the outside edge portion of the support member 270, is provided in the base member 500. Projecting portions 610 of a frame 600 are inserted through support member through holes 271 (hereinafter referred to as "through hole 271") of the support member 270, and the top ends (top end portions) of the projecting portions 610 are welded to chamfered portions (C-chamfered portions) 271c of the through holes 271. The base member 500 is attached to projecting portions for base member fixation 650 which are provided on the frame 600 and which are different from the projecting portions 610, via, for example, fastener members such as screws or the like (the heads of the screws are not depicted in FIG. 3). With this, the base member 500 is attached to the frame 600. In a state that the support member 270 and the base member 500 are attached to the frame 600, the whole support member 270 is accommodated within the opening 510 of the base member 500 and the lower surface of the support member 270 is substantially flush with the lower surface of the base member 500. Note that, each of the projecting portions 610 is formed with a stepped portion 610d similar to the stepped portion 110d of the first embodiment and its modification. In the second embodiment, however, in a state that the support member 270 and the base member 500 are attached to the frame 600, the upper surface of the support member 270 is in contact with the stepped portions 610d to keep a distance between the frame 600 and the support member 270 constant.

By adopting such configuration, in addition to the effects brought about by the first embodiment and its modification described above, it is possible to shorten the distance between the upper surface of the frame 600 and the lower surface of the support member 270 as compared to the aforementioned first embodiment and its modification. Thus, a low profile of the product can be achieved more effectively.

As explained above, in the first embodiment and its modification, the three projecting portions 110 are provided around the hole 120 of the frame 100 so as to align in the circumferential direction of the hole 120. Then, because the stepped portions 110d are provided on the projecting portions 110, respectively, the distance between the frame 100 and the support member 210 (250) are kept constant in a state that every component is assembled. Further, in the second embodiment, in the same manner as in the first embodiment, the projecting portions 610 are provided around a stick manipulating portion projection hole 620. Then, because the stepped portions 610d are provided on the projecting portions 610, respectively, the distance between the frame 600 and the support member 270 are kept constant.

In the above second embodiment, the chamfered portion 271c is formed in the opening portion of each support member through hole of the support member. However, the chamfered portion 271c may not be formed, as in the first embodiment, and the welded portion may project out from the lower surface of the support member 270. In such a case, as in the first embodiment, it is possible to obtain such a structure that assembling is easy and there is no deviation in the positional relation between the frame and the pointing stick.

In the first embodiment described above, it is also possible to fix the support member 210 to the projecting portions 110 by screwing a screw or the like into a lower end of each projecting portion 110 via the support member 210, instead of welding the top ends of the projecting portions 110 of the frame 100 to the support member 210. It is also possible to produce the effect of the present teaching by this fixation method. In the same manner, in the modification of the first embodiment and the second embodiment described above, it is also possible to fix the support member to the projecting portions by screwing a flat countersunk screw, having a head of which shape corresponds to the shape of the chamfered portion, into the lower end of each projecting portion via the support member, instead of welding the top ends of the projecting portions of the frame to the recess defined by the chamfered portions. It is also possible to produce the effect of the present teaching by this fixation method.

Further, in the embodiments described above, the materials, shapes, dimensions, and numbers are all exemplary without exception. Needless to say, therefore, it is possible to appropriately select other materials, shapes, dimensions, and numbers without departing from the scope and spirit of the present teaching.

Further, in the present embodiments, the present teaching is applied to a notebook PCs. However, without being limited to this application, the present teaching may also be applied to manipulating sticks of portable video game consoles, manipulating sticks of various other devices, etc.

According to the above embodiments, it is possible to provide a pointing device fitting structure and a pointing device which are easy to assemble, which are capable of fixing the positional relation between its frame and pointing stick without deviation, and furthermore, which are capable of realizing a low profile of the product.

What is claimed is:

1. A pointing device fitting structure comprising:
a frame which has an aperture and which is provided with a first projecting portion and a second projecting portion, the second projecting portion being provided on an outside of the first projecting portion with respect to the aperture;
a support member to which a pointing stick is fixed; and
a base member in which an opening is formed;
wherein the frame is tightly fixed to the support member via the first projecting portion so that the pointing stick is arranged in the aperture of the frame, and the frame is tightly fixed to the base member via the second projecting portion, without an intervention of the support member, so that the support member is arranged in the opening of the base member.

2. The pointing device fitting structure according to claim 1, wherein a through hole through which the first projecting portion is inserted is formed in the support member.

3. The pointing device fitting structure according to claim 2, wherein a chamfered portion is formed in the through hole of the support member.

4. The pointing device fitting structure according to claim 3, wherein a top end portion of the first projecting portion does not come out of a bottom surface of the support member.

5. The pointing device fitting structure according to claim 1, wherein a stepped portion is formed on the first projecting portion.

6. The pointing device fitting structure according to claim 1, wherein the first projecting portion has a top end portion, and the top end portion is fixed to the support member by way of welding.

7. The pointing device fitting structure according to claim 1, wherein the opening is configured to arrange the support member without an interference between the support member and the base member.

8. The pointing device fitting structure according to claim 1, wherein the base member is a flat plate on which a circuit board is to be arranged.

9. The pointing device fitting structure according to claim 1, wherein the support member is a single flat plate having an upper surface to which a strain sensor and a lower end of the pointing stick are to be fixed.

10. The pointing device fitting structure according to claim 1, wherein the base member and the support member are entirely separated from each other by a gap disposed between the base member and the support member.

11. The pointing device fitting structure according to claim 1, wherein an entirety of the base member is arranged outside of the aperture of the frame.

12. A pointing device fitting structure comprising:
a frame which has an aperture and a plurality of first projection portions provided around the aperture and a plurality of second projection portions provided around the aperture, the plurality of second projection portions being provided on an outside of the plurality of first projection portions with respect to the aperture;
a pointing device which includes a support member and a pointing stick attached to the support member in a tiltable manner; and
a base member in which an opening is formed,
wherein the support member is tightly fixed to the frame via the plurality of first projection portions and the base member is tightly fixed to the frame via the plurality of second projection portions, without an intervention of the support member, so that the support member is arranged in the opening of the base member and the pointing stick is inserted into the aperture.

13. The pointing device fitting structure according to claim 12, wherein the support member has a plurality of through holes provided around the pointing stick, and the support member is fixed to the frame by inserting the plurality of first projection portions into the plurality of through holes, respectively.

14. The pointing device fitting structure according to claim 12, wherein the base member is a flat plate on which a circuit board is to be arranged.

15. The pointing device fitting structure according to claim 12, wherein the support member is a single flat plate having an upper surface to which a strain sensor and a lower end of the pointing stick are to be attached.

16. The pointing device fitting structure according to claim 12, wherein the base member and the support member are entirely separated from each other by a gap disposed between the base member and the support member.

17. The pointing device fitting structure according to claim 12, wherein an entirety of the base member is arranged outside of the aperture of the frame.

* * * * *